(12) United States Patent
Cordell et al.

(10) Patent No.: US 11,003,853 B2
(45) Date of Patent: May 11, 2021

(54) LANGUAGE IDENTIFICATION SYSTEM FOR LIVE LANGUAGE INTERPRETATION VIA A COMPUTING DEVICE

(71) Applicant: Language Line Services, Inc., Monterey, CA (US)

(72) Inventors: Jeffrey Cordell, Carmel, CA (US); James Boutcher, Carmel, CA (US); Lindsay D'Penha, Carmel, CA (US)

(73) Assignee: Language Line Services, Inc., Monterey, CA (US)

( * ) Notice: Subject to any disclaimer, the term of this patent is extended or adjusted under 35 U.S.C. 154(b) by 213 days.

(21) Appl. No.: 16/411,685

(22) Filed: May 14, 2019

(65) Prior Publication Data
US 2020/0364297 A1  Nov. 19, 2020

(51) Int. Cl.
*G06F 40/263* (2020.01)
*G06F 3/16* (2006.01)
*G10L 15/00* (2013.01)
*G06F 40/58* (2020.01)

(52) U.S. Cl.
CPC ............ *G06F 40/263* (2020.01); *G06F 3/167* (2013.01); *G06F 40/58* (2020.01); *G10L 15/005* (2013.01)

(58) Field of Classification Search
CPC ........ G06F 40/263; G06F 40/40; G06F 40/56; G06F 40/58; G10L 15/00
USPC ................................ 704/2, 1, 8, 9, 257, 277
See application file for complete search history.

(56) References Cited

U.S. PATENT DOCUMENTS

| | | | |
|---|---|---|---|
| 2012/0035908 A1* | 2/2012 | Lebeau | G10L 15/26 704/2 |
| 2018/0359349 A1* | 12/2018 | Graylin | G10L 13/00 |
| 2020/0111476 A1* | 4/2020 | Kamano | G10L 15/02 |

* cited by examiner

*Primary Examiner* — Qi Han
(74) *Attorney, Agent, or Firm* — Patent Ingenuity, P.C.; Samuel K. . Simpson (57) ABSTRACT

A configuration is implemented to generate, with a processor, an image and audio user interface which has a language identification indicium that is image-based. Further, the configuration sends, with the processor, the image and audio user interface to a computing device so that the image and audio user interface is displayed to a user. Moreover, the configuration receives, with the processor, audio data captured by the computing device from a user positioned at the computing device upon activation of the language identification indicium. Additionally, the configuration performs, with the processor, an audio analysis on the captured audio data to identify a language spoken by the user. Finally, the configuration establishes, with the processor, a language interpretation session between the computing device and a communication device associated with a language interpreter based on the identified language.

12 Claims, 8 Drawing Sheets

LANGUAGE IDENTIFICATION SYSTEM FOR LIVE LANGUAGE INTERPRETATION VIA A COMPUTING DEVICE

BACKGROUND

1. Field

This disclosure generally relates to the field of language interpretation. More particularly, the disclosure relates to a computerized system for language interpretation.

2. General Background

Conventional configurations for on-demand language interpretation typically necessitate navigation through a variety of menus to determine languages for interpretation/translation. For instance, a first human user, who speaks a first human-spoken language (i.e., a language that is traditionally spoken by a group of people originating from a particular geographical location, country, or region) such as English, may want to have a voice-based conversation in-person with a second human user, who speaks a second human-spoken language. As an example, an English speaker and a Spanish speaker may want to have a conversation, while both being in the same physical location.

In order to obtain a language interpreter for their conversation, the English speaker and/or the Spanish speaker will typically have to contact a language interpretation service, via a communication device (e.g., landline telephone, smartphone, tablet device, smartwatch, etc.) that will provide a language interpreter, who may interpret/translate their conversation. Such identification will typically occur through a myriad of menus, voice-based and/or image-based, in which one or both of the speakers select the languages to be interpreted/translated. Yet, identifying the languages to be interpreted/translated may be relatively time-consuming for the particular conversation of the English speaker and the Spanish speaker. In a time-sensitive situation, the English speaker and/or the Spanish speaker may not have time to search through over one hundred languages for their given languages.

Thus, conventional configurations typically utilize user interfaces, audio-based and/or video-based, that are often too cumbersome to provide a language interpretation service in time-sensitive situation.

SUMMARY

A configuration is implemented to generate, with a processor, an image and audio user interface ("IAUI"), which has a language identification indicium that is image-based. Further, the configuration sends, with the processor, the IAUI to a computing device so that the IAUI is displayed to a user. Moreover, the configuration receives, with the processor, audio data captured by the computing device from a user positioned at the computing device upon activation of the language identification indicium. Additionally, the configuration performs, with the processor, an audio analysis on the captured audio data to identify a language spoken by the user. Finally, the configuration establishes, with the processor, a language interpretation session between the computing device and a communication device associated with a language interpreter based on the identified language.

In one embodiment, the configuration is implemented via computer executable instructions that are stored on a computer readable device. In another embodiment, the configuration is implemented as a process. In yet another embodiment, the configuration may be implemented via a system that utilizes the processor, which may be specialized for generating the IAUI.

In another embodiment, the configuration may be implemented to generate, with the processor, an audio user interface. The configuration sends, with the processor, the audio user interface to a user communication device so that the audio user interface is provided to a user via the user communication device. Further, the configuration receives, with the processor, audio data captured by the user communication device from a user positioned at the user communication device upon activation of a language identification indicium on the audio user interface. Moreover, the configuration performs, with the processor, an audio analysis on the captured audio data to identify a language spoken by the user. Finally, the configuration performs, with the processor, a language interpretation session between the user communication device and an interpreter communication device associated with a language interpreter based on the identified language.

BRIEF DESCRIPTION OF THE DRAWINGS

The above-mentioned features of the present disclosure will become more apparent with reference to the following description taken in conjunction with the accompanying drawings wherein like reference numerals denote like elements and in which.

DETAILED DESCRIPTION

A language identification system is provided to automatically determine a particular language so that a communication may be routed to a corresponding language interpreter. Further, an IAUI may be generated so that a user of a language interpretation application stored on a mobile computing device (e.g., smartphone, tablet device, smartwatch, etc.) may provide a user input to request automatic identification of one or more languages spoken by users in proximity to the mobile computing device. Accordingly, the language identification system provides an improved user interface, which minimizes the navigation necessitated on the part of users of the language interpretation application. The language identification system avoids the menu navigation of conventional configurations; such avoidance may be crucial in a time-sensitive environment (e.g., a hospital) wherein one or more speakers may have difficulty providing a menu selection. For instance, a patient in a hospital may not have the physical ability at the time to perform a menu selection, and a healthcare professional may not be familiar enough with the language spoken by the patient to identify the language of the patient.

Figure 1A:
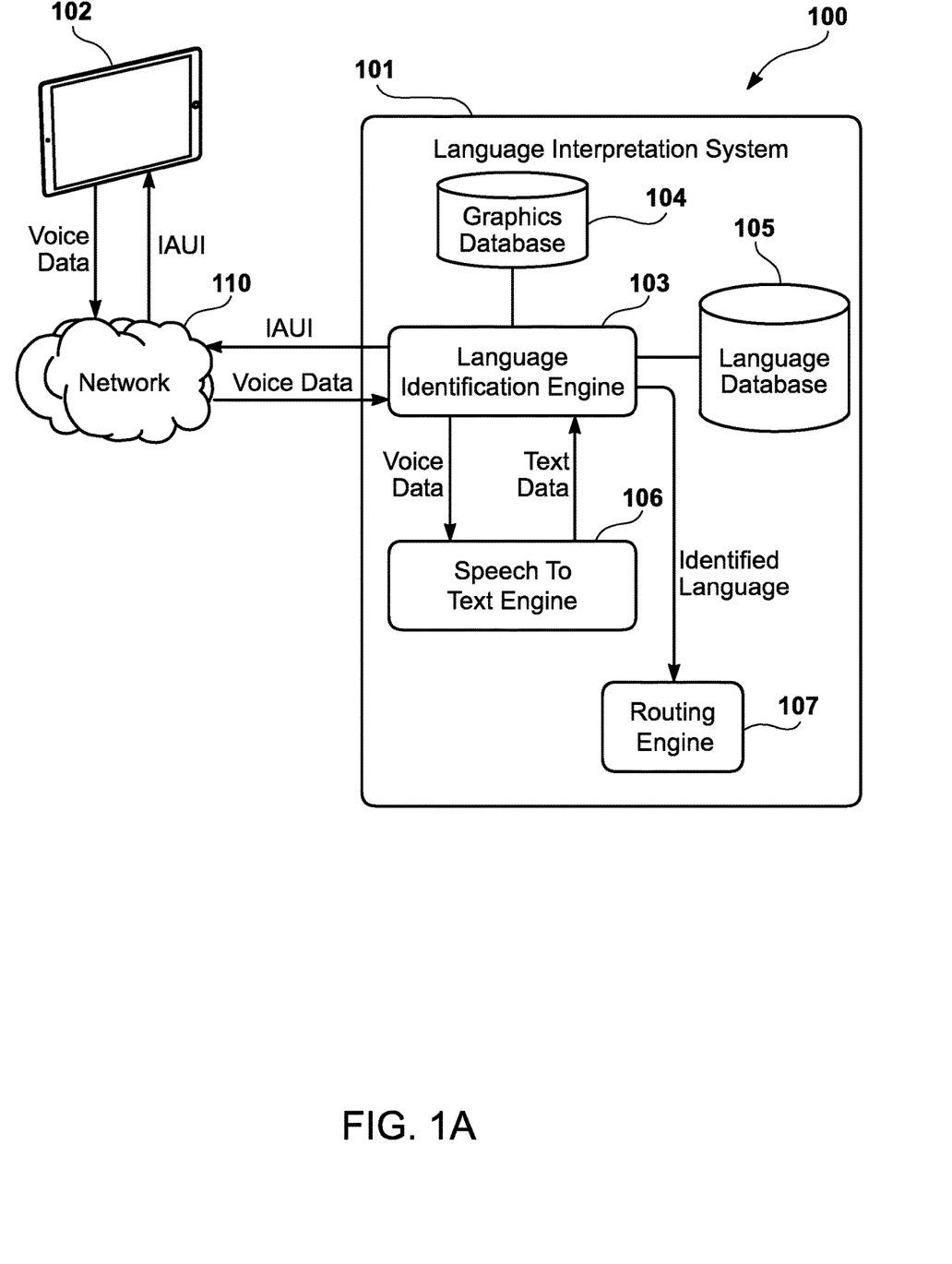
FIG. 1A illustrates the language interpretation configuration having a language interpretation system that interacts with a mobile computing device.
Figure 1B:
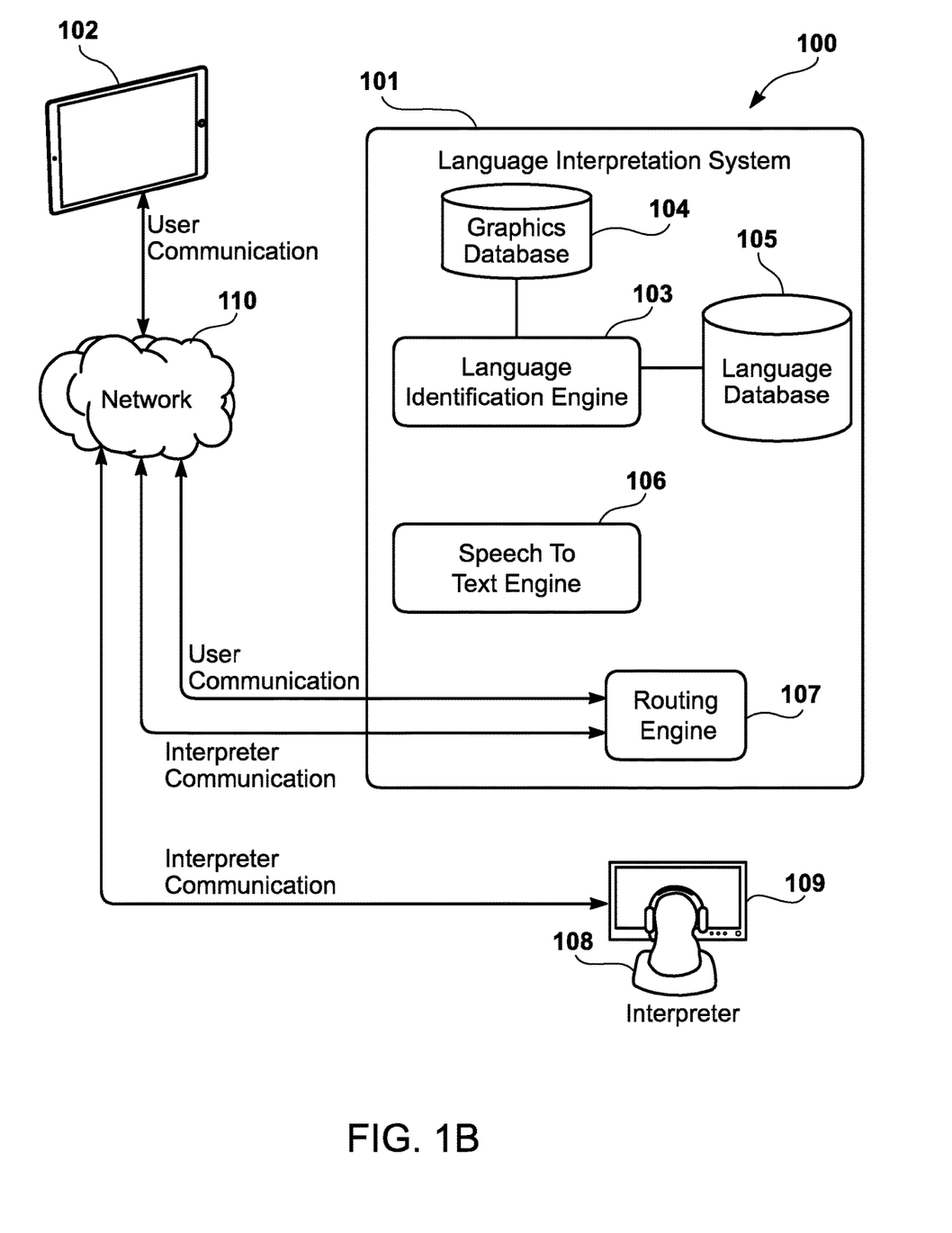
FIG. 1B illustrates the routing engine routing the communication between the language interpretation system and the mobile computing device to a communication device associated with a human language interpreter.

FIGS. 1A and 1B illustrate a language interpretation configuration 100 that identifies a language and routes a communication to a corresponding language interpreter. In particular, FIG. 1A illustrates the language interpretation configuration 100 having a language interpretation system 101 that interacts with a mobile computing device 102 (e.g., tablet device, smartphone, smartwatch, etc.). (Although the mobile computing device 102 is illustrated as the communication device that interacts with the language interpretation system 101, other communication devices (e.g., landline telephones, personal computers, etc.) may alternatively interact with the language interpretation system 101.)

In one embodiment, the language interpretation system 101 has a language identification engine 103 that generates an IAUI for facilitating language identification of a language spoken by a user. The language identification engine 103 may be in operable communication with a graphics database 104 that stores one or more graphics elements, which the language identification engine 103 may use to compose the IAUI. After composing the IAUI, the language identification engine 103 delivers the IAUI to the mobile computing device 102 so that it may be rendered on the mobile computing device 102. A user, or another user acting on behalf of the user, may interact with the IAUI that is rendered on the mobile computing device 102 to provide voice data, which may be sent to the language identification engine 103 via a network 110. Rather than inundating a user with menus for selection of one or more languages to be interpreted, the IAUI allows the user to activate an indicium that initiates an audio capture of the user's voice in his or her human-spoken language.

Upon receiving voice data corresponding to utterances captured by the mobile computing device 102, such as through a microphone integrated within the mobile computing device 102, the language identification engine 103 may perform an audio analysis on the voice data to identify the language spoken by the user. As an example of such audio analysis, the language identification engine 103 may provide the voice data to a speech-to-text engine 106 that converts the voice data into text data. The language identification engine 103 may then compare the text with the text of various languages stored within a language database 105. Based on a predetermined similarity threshold being reached, the language identification engine 103 may then establish the identity of the particular language. For instance, the predetermined similarity threshold may be certain quantity of words being matched in one language, while a certain quantity of words are not matched to other languages. As an example, the predetermined similarity threshold may necessitate that six words are similar to the identified language, whereas no more than two words may be similar to another language in the language database 105. Alternatively, the predetermined similarity threshold may be based only on the quantity of words or phrases that are similar to a particular language. (The foregoing examples are provided merely for illustrative purposes, given that different quantities and different metrics may be used for the comparison analysis.) In one embodiment, the speech-to-text engine 106 is part of the language identification engine 103. Accordingly, the language identification engine 103 may perform the functionality of a speech recognition engine.

In one embodiment, the IAUI may continue to direct the user (e.g., via visual or audio prompts) to continue speaking to gather more voice data until the language identification engine 103 has enough data to meet the predetermined similarity threshold. For example, the language identification engine 103 may determine after obtaining ten words that only four words are matched to the Polish language, and that more data is necessary. The language identification engine 103 may provide requests for more data to the mobile computing device 102 so that the IAUI may prompt the user to provide more voice data. Alternatively, the IAUI may be generated, with computer readable instructions, by the language identification engine 103 to time-out after a predetermined time period and display a prompt to the user to provide more voice data. Moreover, upon identifying the language spoken by the user, the language identification engine 103 may provide an interrupt command to the mobile computing device 102 to disable the IAUI and provide a language interpretation service based upon the identified language. (Although the language identification engine 103 is illustrated as generating the IAUI, a rendering engine may be utilized instead to perform this functionality, leaving the language identification engine 103 to perform the audio analysis.)

In particular, the language identification engine 103 may provide the identified language to a routing engine 107. FIG. 1B illustrates the routing engine 107 routing the communication between the language interpretation system 101 and the mobile computing device 102 to a communication device 109 associated with a human language interpreter 108. Alternatively, the communication may be routed to a machine language interpreter. Accordingly, language interpretation may be initiated after the communication is routed to the human language interpreter 108 that is skilled in providing language interpretation/translation in the language identified by the language identification engine 103.

Figure 2:
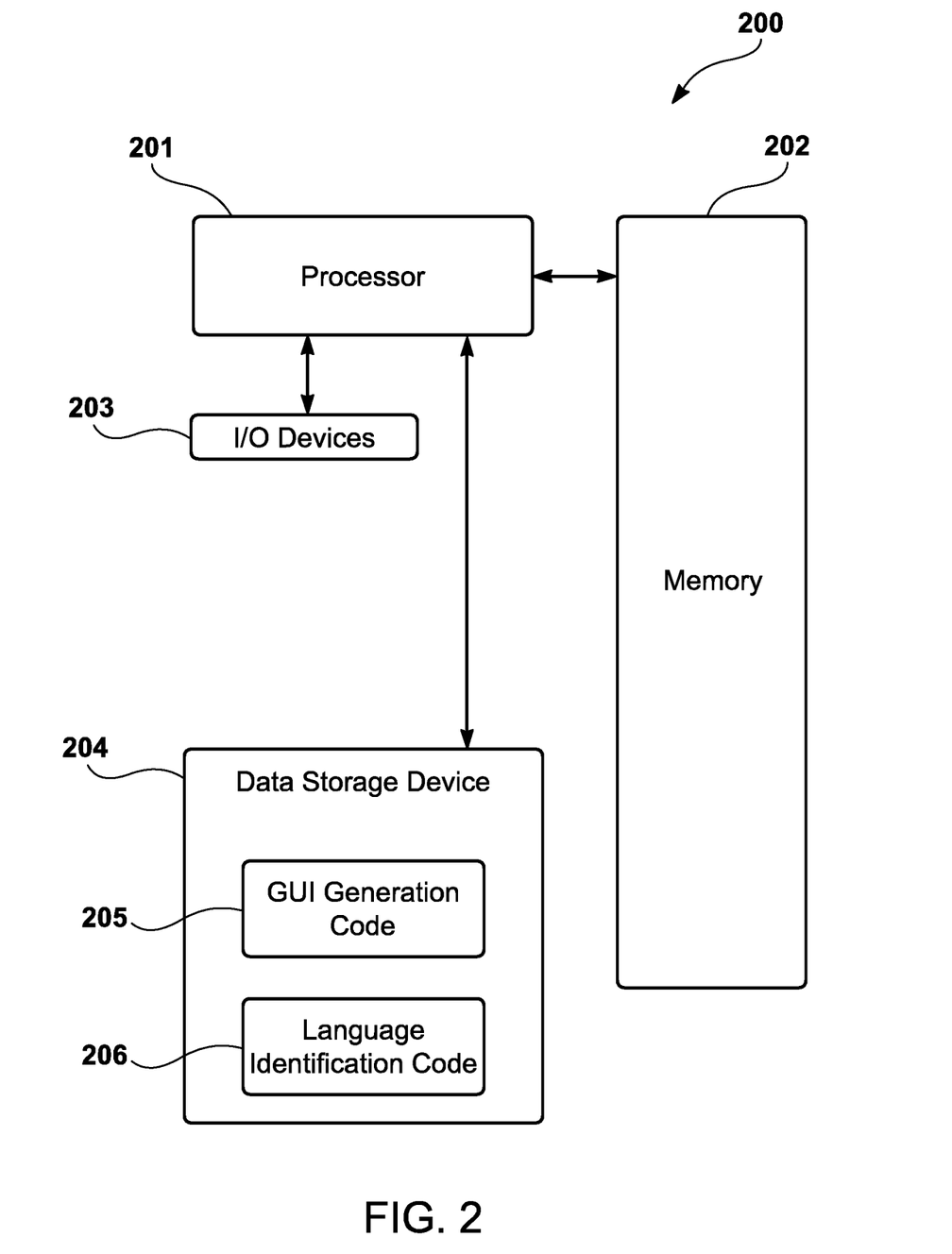
FIG. 2 illustrates a system configuration that may be used to implement the language interpretation system illustrated in FIGS. 1A and 1B.

FIG. 2 illustrates a system configuration 200 that may be utilized to implement the language interpretation system 101 illustrated in FIGS. 1A and 1B. The system configuration 200 has a processor 201 that is in operable communication with a memory device 202, one or more input/output ("I/O") devices 203, and a data storage device 204. Further, the processor 201 loads various code (e.g., IAUI generation code 205 and language identification code 206) from the data storage device 204 into the memory device 202.

The processor 201 may be a specialized processor (e.g., a graphics processor unit ("GPU")) that utilizes the IAUI generation code 205 to generate the IAUI via the language identification engine 103 and the graphics database 104, as illustrated in FIGS. 1A and 1B. Further, the processor 201 additionally, or alternatively, may be a specialized processor (e.g., specifically configured for audio processing) that utilizes the language identification code 206 to analyze the captured audio to identify the language of the user speaking into the mobile computing device 102.

Figure 3:
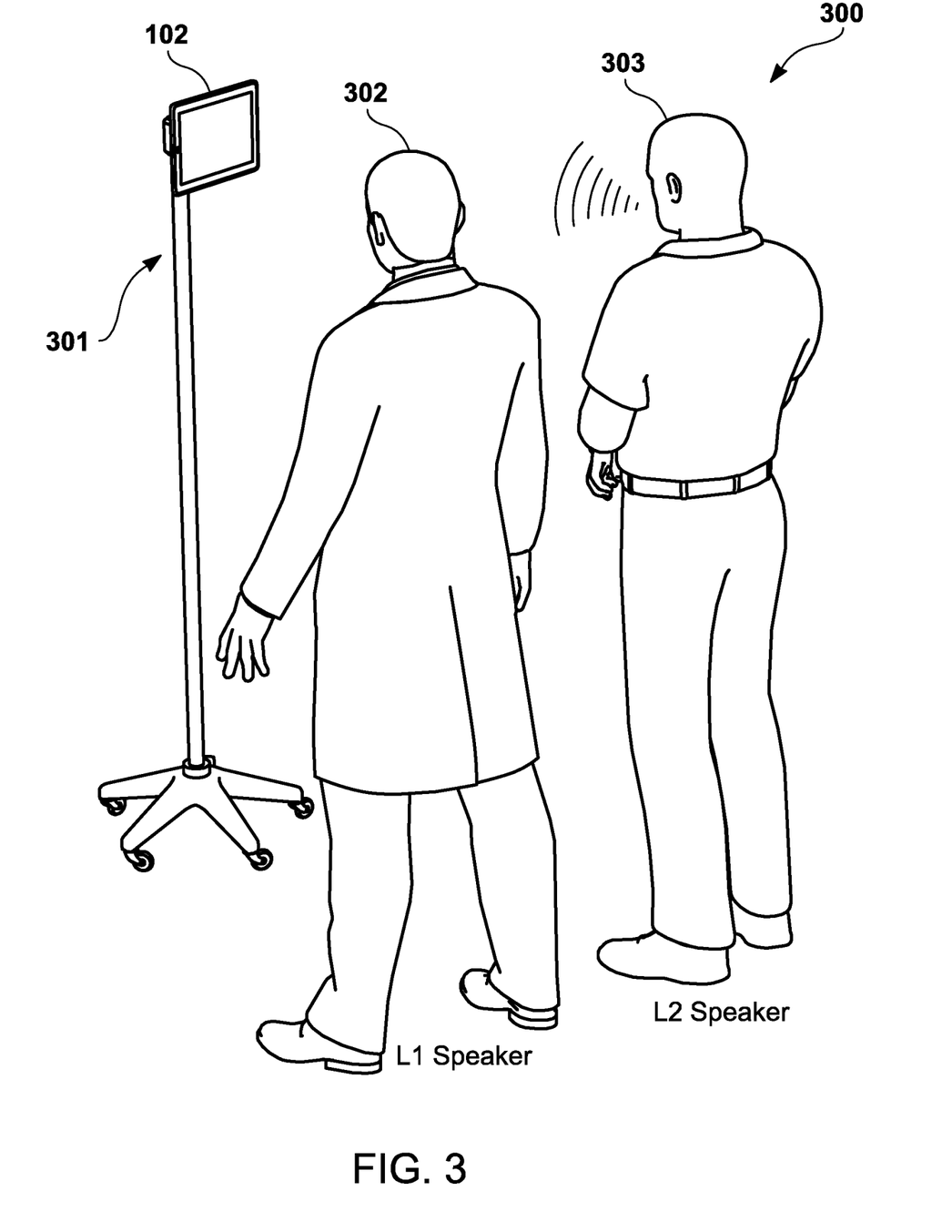
FIG. 3 illustrates an example of a healthcare environment in which the mobile computing device may be utilized in conjunction with the language interpretation system.

The language interpretation system 101 may be implemented in a variety of environments. In particular, the IAUI of the language interpretation system 101 improves utilization of the mobile computing device 102 in time-sensitive environments to reduce the time in which services may be delivered to the mobile computing device 102. As an example, FIG. 3 illustrates an example of a healthcare environment 300 (e.g., hospital) in which the mobile computing device 102 may be utilized in conjunction with the language interpretation system 101. For instance, the mobile computing device 102 may be positioned within a mobile apparatus 301, which is movable to various locations within the healthcare environment 300. A healthcare professional 302, who speaks a first human-spoken language (e.g., English) may want to speak with a patient 303, who speaks a second human-spoken language (e.g., Polish). Since the patient 303 may be incapacitated, the mobile apparatus 301 may be moved to a location at which the healthcare professional 302 and the patient 303 are situated. (Although the mobile computing device 102 is illustrated as being positioned within the mobile apparatus 301, the mobile computing device 102 may be utilized without being positioned within the mobile apparatus 301.)

As an example, the healthcare professional 302, who speaks English, may have to communicate with the patient 303, who speaks Polish, to properly diagnose and treat the patient 303. Yet, the healthcare professional 302 may not be able to readily identify that the language spoken by the patient 303 is Polish, and the patient 303 may not speak enough English to convey to the healthcare professional 302 that he or she speaks Polish. Furthermore, given his or her physical condition, the patient 303 may not be capable of interacting with a myriad of menus to select Polish as his or her language.

Accordingly, the healthcare professional 302 may activate a voice capture indicium on the IAUI to begin capturing voice utterances of the patient 303. Without the healthcare professional 302 having to guess, and the patient 303 having to navigate menus, the IAUI of the mobile computing device 102 is able to deliver the voice data captured from the patient 303 to the language identification engine 103 for audio analysis. Once the mobile computing device 102 has captured enough voice data to meet the predetermined similarity threshold, the language identification engine 103 establishes a match to the Polish language.

In one embodiment, the predetermined similarity threshold may be weighted based on one or more predetermined weighting criteria being met. For example, one weighting criterion may be mention of a specific language (e.g., Polish) in the audio captured from the user; such criteria being met increases the confidence level of the language being Polish disproportionately in comparison with non-weighted criteria (e.g., word-for-word matching).

Figure 4A:
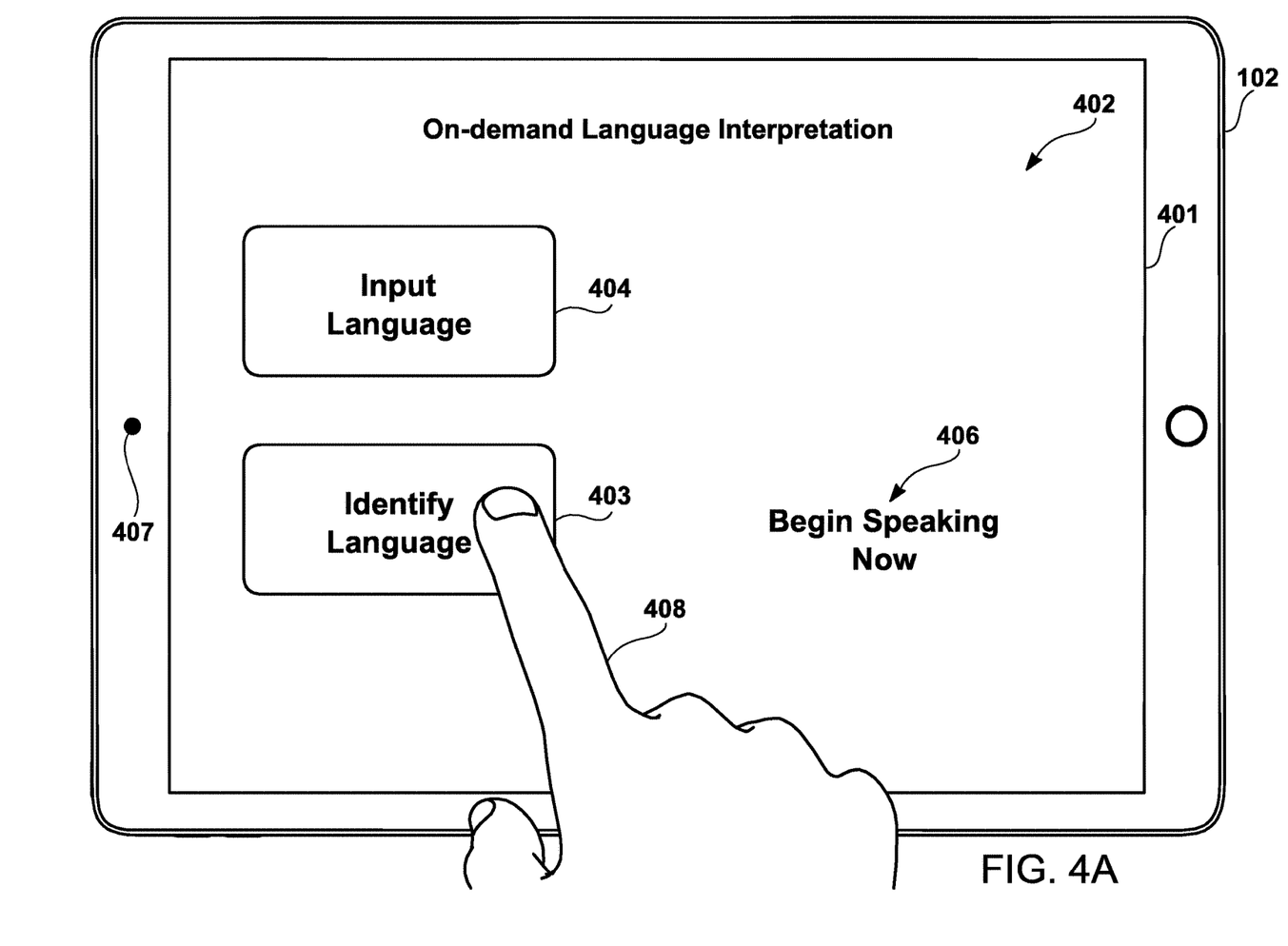
FIG. 4A illustrates an example of an IAUI that may be generated by the language identification engine, illustrated in FIGS. 1A and 1B, for rendering by the mobile computing device.
Figure 4B:
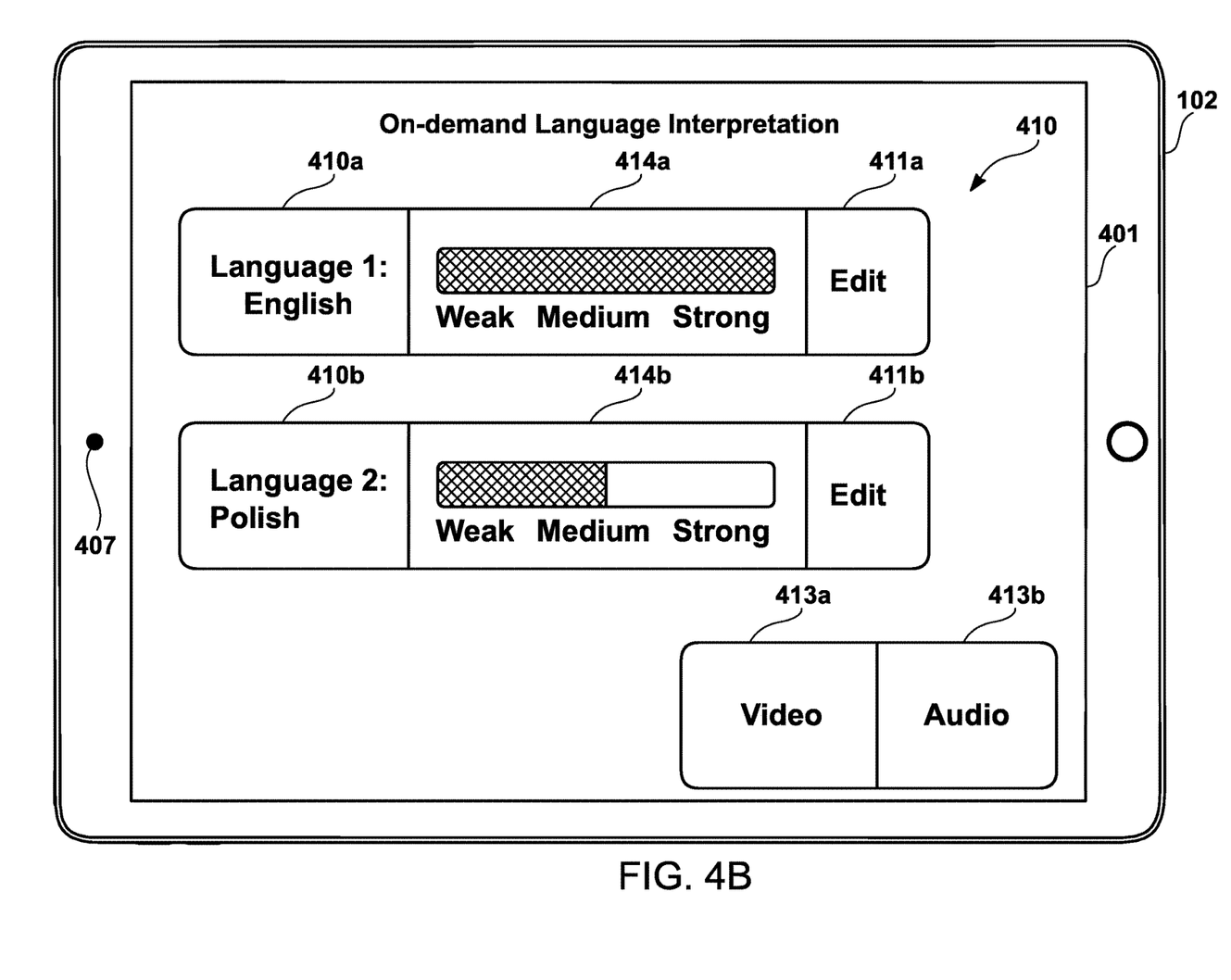
FIG. 4B illustrates an example of a language interpretation graphical user interface ("GUI") that may be displayed by the mobile computing device after the IAUI is disabled.
Figure 4C:
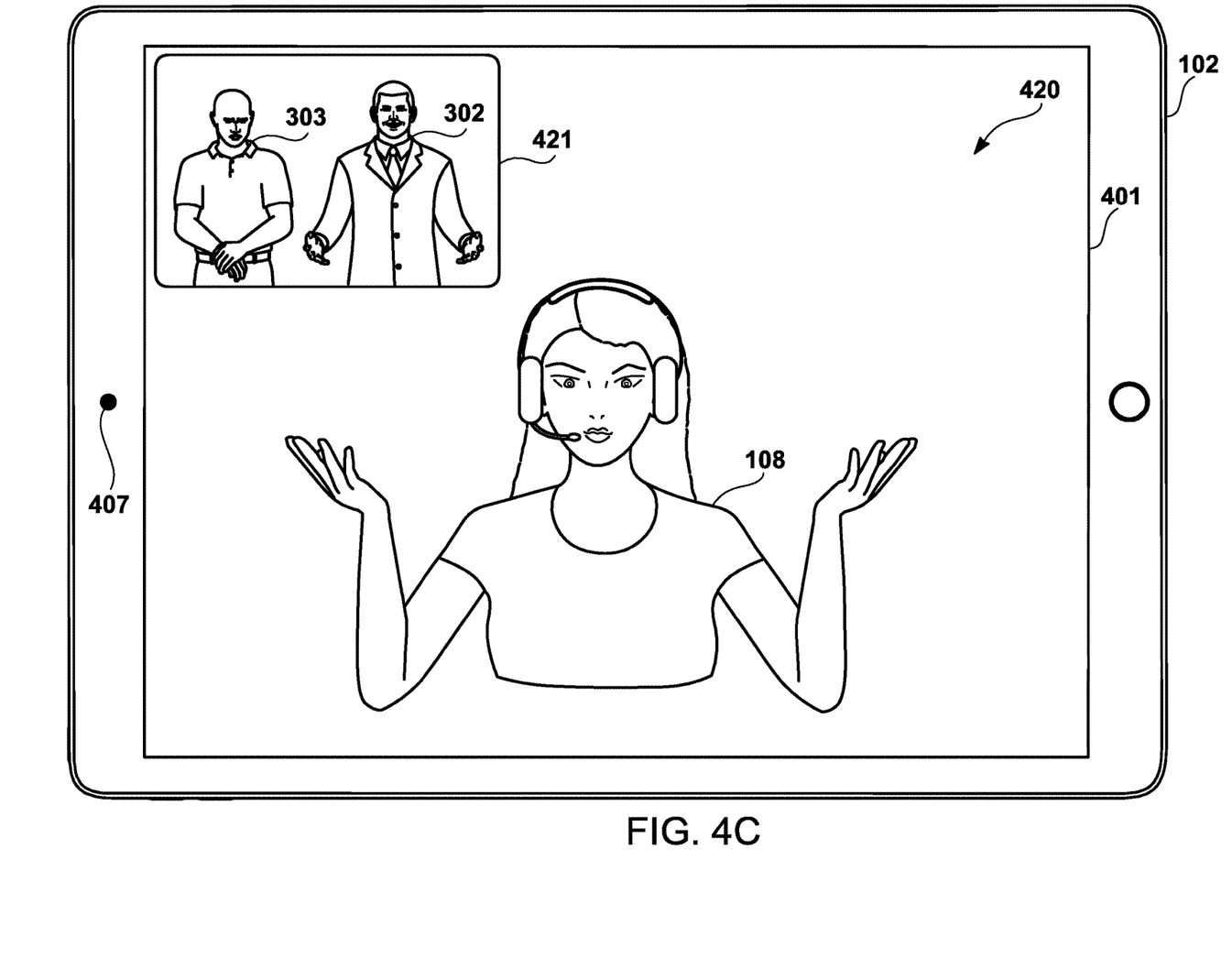
FIG. 4C illustrates an example of the language interpretation GUI rendering a language interpretation session between the users situated at the mobile computing device and a human language interpreter.

FIGS. 4A-4C illustrate examples of various screenshots that may be displayed by a display screen 401 of the mobile computing device 102 illustrated in FIGS. 1A and 1B. In particular, FIG. 4A illustrates an example of an IAUI 402 that may be generated by the language identification engine 103, illustrated in FIGS. 1A and 1B, for rendering by the mobile computing device 102. In one embodiment, the IAUI 402 may display a language identification indicium 403 (e.g., button) that may be activated via a user input (e.g., touch screen input, pointing device input, etc.) such as a digit 408 of a user. For example, the healthcare professional 302 or the patient 303, illustrated in FIG. 3, may activate the language identification indicium 403 to initiate voice capture of the words uttered by the patient 303. Accordingly, the language identification indicium 403 may be associated with a command that invokes a hardware component integrated within, or in operable communication with, the mobile computing device 102 (e.g., a microphone 407).

In one embodiment, the IAUI 402 is configured to stream the captured voice data from the mobile computing device 102 to the language identification engine 103. For example, the IAUI 402 may be configured to stream data chunks in predetermined time intervals (e.g., ranging from one millisecond to one second) allowing the language identification engine 103 to receive the captured voice data in real-time from the time that the audio was captured from the patient 303, illustrated in FIG. 3. Further, the speech-to-text engine 103, illustrated in FIGS. 1A and 1B, may convert the received audio data to text so that the language identification engine 103 may begin tallying words matched to the language database 105 in real-time (e.g., ranging from one millisecond to one second) from the time that the voice data was captured. As a result, the language identification engine 103 is able to begin processing the audio captured from the patient 303 even if that amount of captured audio is not sufficient at that juncture to complete the audio analysis. Accordingly, the time duration for the audio analysis is improved by the language identification engine 103 initiating the audio processing with available voice data, rather than waiting for a large amount of voice data to be sent at one time, which may be over-inclusive of voice data to meet the predetermined similarity threshold. In other words, the predetermined similarity threshold may have been met with a smaller amount of voice data.

The IAUI 402 may also have one or more prompts 406. For example, after the language identification indicium 403 is activated, the IAUI 402 may present a prompt to "Begin Speaking Now." The prompts 406 may be based on one or more real-time communications between the language identification engine 103 and the IAUI 402. As an example, the IAUI 402 may present a prompt to "Move Closer" or "Speak More Clearly," which the IAUI 402 displays as a result of a communication from the language identification engine 103. For instance, the language identification engine 103 may have attempted to match words from the captured audio with languages from the language database 105 but was unable to match any words; as a result, the language identification engine 103 concluded that the audio quality needed to be improved for audio processing.

Although the IAUI 402 may identify languages solely based on audio capture, it may also allow for image-based input of additional languages. For example, an input language indicium 405 may be displayed by the IAUI 402 to allow the healthcare professional 302 to input the first human-spoken language as English. The healthcare professional 302 may potentially provide such input prior to meeting with the patient 303. As another example, the IAUI 402 may be generated based on the first human-spoken language (e.g., English) such that no input of the first human-spoken language is necessary.

In another embodiment, the language identification engine 103 waits for an amount of data to be captured that may be of a time duration greater than real-time. For example, the IAUI 402 may have a start indicium and an end indicium that allow the healthcare professional 302 and/or the patient 303 to decide when the voice capture should begin and end. Alternatively, a user may continue pressing, or holding, the language identification indicium 403 until the language is identified, as indicated by the IAUI 402, or other interface. In other words, a language detection mode may be activated via the language identification indicium 403, the duration of which may be determined according to various forms of user interaction with the language identification indicium 403. As a result, the healthcare professional 302 and/or the patient 303 may ensure that the voice data that is captured is of a sufficient quality for language identification engine 103 to identify the second human-spoken language.

Upon identifying the second human-spoken language, the language identification engine 103 may send a communication to the mobile computing device 102 to disable the IAUI 402. FIG. 4B illustrates an example of a language interpretation GUI 410 that may be displayed by the mobile computing device 102 after the IAUI 402 is disabled. In particular, the routing engine 107 illustrated in FIG. 1B may generate the language interpretation GUI 410 and send it to the mobile computing device 102 for display on the display screen 401 after the second human-spoken language is identified.

The language interpretation GUI 410 may display a first human-spoken language indicium 410a and a corresponding edit indicium 411a in addition to a second human-spoken language indicium 410b and a corresponding edit indicium 411b. Accordingly, the identified and/or inputted languages from the IAUI 402 may be presented via the language interpretation GUI 410, which allows the healthcare professional 302 and the patient 303 to confirm that the identified and/or inputted languages are correct. If a language has not been identified correctly, an edit indicium 411a or 411b may be activated to return to the IAUI 402, illustrated in FIG. 4A, for additional voice capture or image-based inputs; alternatively, such additional voice capture or image-based inputs may be provided from the language interpretation GUI 410.

Moreover, status indicators 414a and 414b may indicate the confidence level of a particular language. For instance, the status indicators 414a and 414b may have indicia corresponding to levels of strength (e.g., weak, medium, and strong), percentages (e.g., zero percent to one hundred percent), etc. In one embodiment, the status indicators 414a and 414b are based on a confidence indication received from the language identification engine 103, which may determine confidence indication based on the predetermined similarity threshold. As an example, the confidence level for English may be strong because that may have been inputted by a user. As another example, the confidence level for Polish may be moderate because that was based on audio captured that closely matched Polish within a relatively short time frame, but more data may be necessary in a relatively longer time frame to establish a strong confidence level.

In another embodiment, the language interpretation GUI 410 displays potential languages that may be a match for the language to be identified. For example, some languages may have some similarity (e.g., Polish, Czech, and Slovak), and may initially be displayed by the language interpretation GUI 410. As the language identification engine 103 processes the captured audio, the language identification engine 103 may establish different confidence levels for each of those similar languages, which are displayed by the language interpretation GUI 410. The language interpretation GUI 410 may then delete the remaining potential languages after one of the languages is determined to exceed the predetermined similarity threshold. In other words, the language interpretation GUI 410 may narrow what is displayed as a potential matched language based on the analysis performed by the language identification engine 103.

In another embodiment, the language interpretation GUI 410 may request a confirmation of the identified language from a user, either through an image-based input (e.g., a confirmation button) or a voice-based input. As another example, a determination that the language was misrecognized is determined when the human language interpreter 108, illustrated in FIGS. 1A and 1B, greets the user in the misrecognized language. The language interpretation GUI 410 may include an indicium that allows a user to transfer to the correct language, or return to language detection mode via audio capture.

Moreover, the language interpretation GUI 410 may display various modality indicia 413a and 413b, which allow a user to select a modality (e.g., video, audio, etc.) for the language interpretation session.

After the first and second human-spoken languages have been identified and/or inputted, and confirmed, the language interpretation GUI 410 may render a language interpretation session 420 between the users situated at the mobile computing device 102 and a human language interpreter 108, as illustrated in FIG. 4C. For example, the language interpretation GUI 410, while in a video modality, may render captured video imagery (e.g., via an image capture device in operable communication with the computing device 109 illustrated in FIG. 1B) of the human language interpreter 108. As a result, both the first human-spoken language user (e.g., the healthcare professional 302) and the second human-spoken language user (e.g., the patient 303) may view the human language interpreter 108 as he or she is performing the language interpretation. Optionally, the language interpretation GUI 410 may display a window 421 that renders video captured of the first human-spoken language user and the second human-spoken language user.

Although the mobile computing device 102 is described as performing the rendering of the IAUI 402 and the language identification indicium 403, other types of devices may be utilized to render the IAUI 402 or other interfaces. For instance, a user communication device, which may or may not have a visual display, may be utilized with an audio-only user interface. As an example, a police radio, or microphone, may have an audio-only interface. Further, a physical or a virtual button may be implemented on the user communication device as the language identification indicium 403. The communication device may also be an Internet-Of-Things ("IoT") device that is built into another device (e.g., wearable device such as a helmet, belt, etc.), or stand-alone, to allow a user, such as a policeman, to activate a language detection mode without viewing a display screen.

Figure 5:
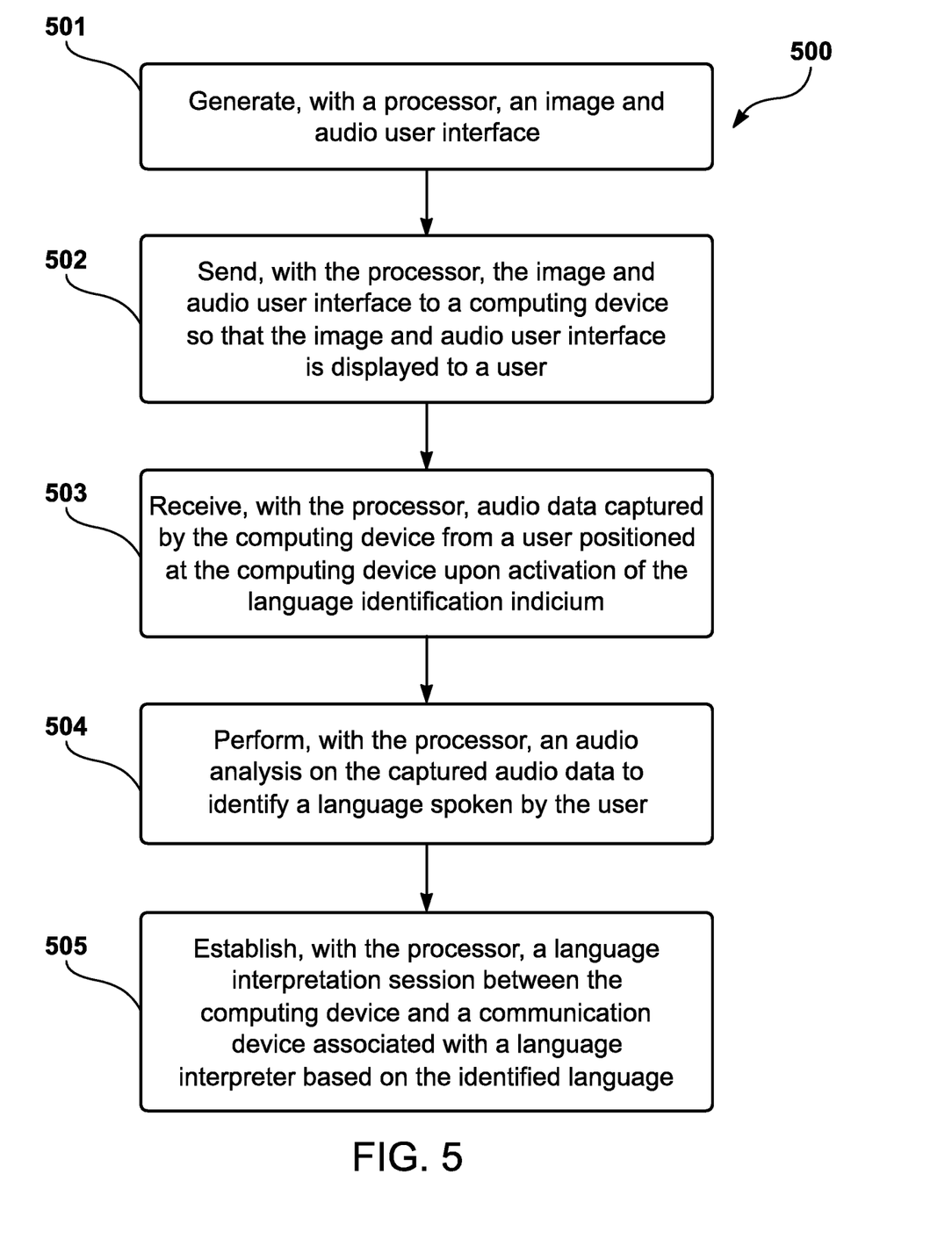
FIG. 5 illustrates a process that may be utilized by the language interpretation system to identify a language.

FIG. 5 illustrates a process 500 that may be utilized by the language interpretation system 101 to identify a language. At a process block 501, the process 500 generates, with the processor 201 illustrated in FIG. 2, the IAUI 402 illustrated in FIG. 4A, which has the language identification indicium 403 that is image-based. Further, at a process block 502, the process 500 sends, with the processor 201, the IAUI 402 to the mobile computing device 102 so that the IAUI 402 is displayed to a user. Moreover, at a process block 503, the process 500 receives, with the processor 201, audio data captured by the computing device 102 from a user positioned at the mobile computing device 102 upon activation of the language identification indicium 403. Additionally, at a process block 504, the process 500 performs, with the processor 201, an audio analysis on the captured audio data to identify a language spoken by the user. Finally, at a process block 505, the process 500 establishes, with the processor 201, a language interpretation session between the mobile computing device 102 and a communication device 109 associated with the language interpreter 108 based on the identified language.

A computer is herein intended to include any device that has a general, multi-purpose or single purpose processor as described above. For example, a computer may be a PC, laptop computer, set top box, cell phone, smartphone, tablet device, smart wearable device, portable media player, video player, etc.

It is understood that the apparatuses described herein may also be applied in other types of apparatuses. Those skilled in the art will appreciate that the various adaptations and modifications of the embodiments of the apparatuses described herein may be configured without departing from the scope and spirit of the present computer apparatuses. Therefore, it is to be understood that, within the scope of the appended claims, the present apparatuses may be practiced other than as specifically described herein.

We claim:

1. A computer program product comprising a computer readable storage device having a computer readable program stored thereon, wherein the computer readable program when executed on a computer causes the computer to:
generate, with a processor, an image and audio user interface, the image and audio user interface having a language identification indicium, the language identification indicium being image-based;
send, with the processor, the image and audio user interface to a computing device so that the image and audio user interface is displayed to a user;
receive, with the processor, audio data captured by the computing device from a user positioned at the computing device upon activation of the language identification indicium;
perform, with the processor, an audio analysis on the captured audio data, to identify a language spoken by the user, by converting the captured audio data to text;
compare, with the processor, the text to language text stored in a language database, the language text corresponding to a plurality of human-spoken languages;
quantify, with the processor, a quantity of words that match one of the plurality of human-spoken languages;
identify, with the processor, a language based on the quantity of words meeting a predetermined similarity threshold; and
establish, with the processor, a language interpretation session between the computing device and a communication device associated with a language interpreter based on the identified language.

2. The computer program product of claim 1, wherein the captured audio data is streamed from the computing device in real-time from audio captured by the computing device.

3. The computer program product of claim 1, wherein the computer is further caused to perform the audio analysis in real-time upon receiving the captured audio data.

4. The computer program product of claim 1, wherein the computer is further caused to generate one or more prompts based on the audio analysis and to send the one or more prompts to the computing device for display at the computing device, the one or more prompts requesting additional voice data for the audio analysis.

5. A system comprising:
a language database that stores language text, the language text corresponding to a plurality of human-spoken languages; and
a processor that generates an image and audio user interface, sends the image and audio user interface to a computing device so that the image and audio user interface is displayed to a user, receives audio data captured by the computing device from a user positioned at the computing device upon activation of a language identification indicium, performs an audio analysis on the captured audio data, to identify a language spoken by the user, by converting the captured audio data to text, compares the text to the language text stored in the language database, quantifies a quantity of words that match one of the plurality of human-spoken languages, identifies a language based on the quantity of words meeting a predetermined similarity threshold, and establishes a language interpretation session between the computing device and a communication device associated with a language interpreter based on the identified language, the image and audio user interface having the language identification indicium, the language identification indicium being image-based.

6. The system of claim 5, wherein the captured audio data is streamed from the computing device in real-time from audio captured by the computing device.

7. The system of claim 5, wherein the processor performs the audio analysis in real-time upon receiving the captured audio data.

8. The system of claim 5, wherein the processor generates one or more prompts based on the audio analysis and to send the one or more prompts to the computing device for display at the computing device, the one or more prompts requesting additional voice data for the audio analysis.

9. A method comprising:
generating, with a processor, an image and audio user interface, the image and audio user interface having a language identification indicium, the language identification indicium being image-based;
sending, with the processor, the image and audio user interface to a computing device so that the image and audio user interface is displayed to a user;
receiving, with the processor, audio data captured by the computing device from a user positioned at the computing device upon activation of the language identification indicium;
performing, with the processor, an audio analysis on the captured audio data, to identify a language spoken by the user, by converting the captured audio data to text;
comparing, with the processor, the text to language text stored in a language database, the language text corresponding to a plurality of human-spoken languages;
quantifying, with the processor, a quantity of words that match one of the plurality of human-spoken languages;
identifying, with the processor, a language based on the quantity of words meeting a predetermined similarity threshold; and
establishing, with the processor, a language interpretation session between the computing device and a communication device associated with a language interpreter based on the identified language.

10. The method of claim 9, wherein the captured audio data is streamed from the computing device in real-time from audio captured by the computing device.

11. The method of claim 9, further comprising performing the audio analysis in real-time upon receiving the captured audio data.

12. The method of claim 9, further comprising generating one or more prompts based on the audio analysis and to send the one or more prompts to the computing device for display at the computing device, the one or more prompts requesting additional voice data for the audio analysis.

* * * * *